United States Patent
Lundgren et al.

(10) Patent No.: US 8,448,335 B2
(45) Date of Patent: May 28, 2013

(54) METHOD OF MANUFACTURING A WALL STRUCTURE AND A MACHINING TOOL

(75) Inventors: Jan Lundgren, Grundsund (SE); Mats Hallqvist, Grästorp (SE)

(73) Assignee: Volvo Aero Corporation, Trollhättan (SE)

( * ) Notice: Subject to any disclaimer, the term of this patent is extended or adjusted under 35 U.S.C. 154(b) by 1013 days.

(21) Appl. No.: 12/516,390

(22) PCT Filed: Dec. 19, 2006

(86) PCT No.: PCT/SE2006/001447
§ 371 (c)(1),
(2), (4) Date: May 27, 2009

(87) PCT Pub. No.: WO2008/076007
PCT Pub. Date: Jun. 26, 2008

(65) Prior Publication Data
US 2010/0058586 A1    Mar. 11, 2010

(51) Int. Cl.
*B21D 53/00*    (2006.01)
*B26D 3/06*    (2006.01)

(52) U.S. Cl.
USPC .............................. 29/890.01; 83/875; 83/876

(58) Field of Classification Search
USPC ................... 29/890.01; 407/30–63; 409/131, 409/132, 64; 83/875, 876
See application file for complete search history.

(56) References Cited

U.S. PATENT DOCUMENTS

| | | | | |
|---|---|---|---|---|
| 1,493,379 A | * | 5/1924 | Perry | 125/15 |
| 3,678,802 A | * | 7/1972 | Butter | 409/132 |
| 3,692,637 A | * | 9/1972 | Dederra | 205/114 |
| 3,798,902 A | * | 3/1974 | Butter | 60/260 |
| 4,707,225 A | * | 11/1987 | Schuler et al. | 205/73 |
| 6,142,139 A | * | 11/2000 | Lupi | 125/15 |
| 6,899,493 B1 | | 5/2005 | Russell | |
| 7,156,011 B2 | * | 1/2007 | Morris et al. | 83/876 |
| 2004/0123460 A1 | * | 7/2004 | Haggander et al. | 29/890.01 |
| 2004/0139721 A1 | * | 7/2004 | Haggander et al. | 60/39.15 |
| 2005/0183562 A1 | * | 8/2005 | Morris et al. | 83/880 |
| 2006/0213182 A1 | | 9/2006 | Fint et al. | |

FOREIGN PATENT DOCUMENTS

| | | |
|---|---|---|
| DE | 2657497 A1 | 6/1978 |
| DE | 20300379 U1 | 4/2003 |
| DE | 102005020033 A1 | 11/2006 |
| JP | 61008218 A1 | 1/1986 |
| JP | 10097815 U | 6/1989 |
| JP | 2002254426 A | 9/2002 |
| WO | 0020749 A1 | 4/2000 |

OTHER PUBLICATIONS

International Search Report for corresponding International Application PCT/SE2006/001447.
International Preliminary Report on Patentability for corresponding International Application PCT/SE2006/001447.
Supplementary European Search Report (Jul. 18, 2012) for corresponding European App. EP 06 83 5867.

* cited by examiner

*Primary Examiner* — David Bryant
*Assistant Examiner* — Jacob Cigna
(74) *Attorney, Agent, or Firm* — WRB-IP LLP

(57) ABSTRACT

A method of manufacturing a wall structure includes producing at least one elongated web in a workpiece by feeding a machining tool along the workpiece, wherein the machining tool simultaneously machines a first side surface of the web, a second side surface of the web and a top surface of the web.

12 Claims, 8 Drawing Sheets

METHOD OF MANUFACTURING A WALL STRUCTURE AND A MACHINING TOOL

BACKGROUND AND SUMMARY

The present invention relates to a method for manufacturing a wall structure. The method is particularly directed to manufacturing a wall structure, which is capable of withstanding a high thermal load, and especially to an engine wall structure. The method is specifically directed to manufacturing the wall structure of a thrust chamber (a combustion chamber and/or an outlet nozzle) for use in a rocket engine. The invention is further directed to a machining tool configured for being used in a step in the manufacturing method.

During operation, a rocket nozzle is subjected to very high stresses, for example in the form of a very high temperature on its inside (in the magnitude of 800° K.) and a very low temperature on its outside (in the magnitude of 50° K.). As a result of this high thermal load, stringent requirements are placed upon the choice of material, design and manufacture of the outlet nozzle. At least there is a need for effective cooling of the outlet nozzle.

The wall structure forming the outlet nozzle has a tubular shape with a varying diameter along a centre axis. More specifically, the outlet nozzle wall structure has a conical or parabolic shape. The outlet nozzle normally has a diameter ratio from the aft or large outlet end to the forward or small inlet end in the interval from 2:1 to 4:1.

The outlet nozzle wall structure comprises cooling channels extending between an upstream end and a downstream end of the nozzle. According to one previously known design, the outlet nozzle wall structure comprises an inner wall, to which hot gas is admitted during engine operation and an outer wall, which is colder than the inner wall during engine operation. There is a plurality of elongated webs connecting the inner wall to the outer wall dividing the space between the walls into a plurality of cooling channels.

During engine operation, any cooling medium may be used to flow through the cooling channels. Regarding a rocket engine, the rocket engine fuel is normally used as a cooling medium in the outlet nozzle. The rocket engine may be driven with hydrogen or a hydrocarbon, i.e. kerosene, as a fuel. Thus, the fuel is introduced in a cold state into the wall structure, delivered through the cooling channels while absorbing heat via the inner wall and is subsequently used to generate the thrust. Heat is transferred from the hot gases to the inner wall, further on to the fuel, from the fuel to the outer wall, and, finally, from the outer wall to any medium surrounding it. Heat is also transported away by the coolant as the coolant temperature increases by the cooling. The hot gases may comprise a flame generated by a combustion of gases and/or fuel.

According to a known method, for manufacturing the outlet nozzle, in a first step, a first machining tool (a turning lathe) is used for working an external surface of the workpiece in order to achieve a desired workpiece thickness. In a second step, a second machining tool (a milling cutter) with two spaced rotary machining elements in the form of cutting wheels is used. The cutting wheels are arranged at a mutual distance corresponding to a desired web thickness. The milling cutter is fed across an external surface of a cylindrical workpiece forming two groves and an intermediate web. The cutting wheels work on the side surfaces of the web.

The milling cutter is indexed in the circumferential direction of the workpiece and run, wherein a plurality of webs are produced. Thus, the webs are integrated in and project from an inner wall. Subsequently, an outer wall is positioned around the inner wall, and joined to the edges of the webs by welding.

It is desirable to provide a method for manufacturing a wall structure provided with cooling channels which extend in a diverging manner, which creates conditions for a faster operation, and robustly achieved channel height, than previously known methods. The invention is especially directed at manufacturing a tubular wall structure with an increasing diameter with axial position and particularly suited for a rocket engine member.

According to an aspect of the present invention, a method comprises the steps of producing at least one elongated web in a workpiece by feeding a machining tool along the workpiece, wherein the machining tool simultaneously machines a first side surface of the web, a second side surface of the web and a top surface of the web.

In this way, all three surfaces (side surfaces and top surface) of the web are worked in one single run. The height, which is very important for the cooling performance, of the web is determined by the position of an intermediate machining element in the machining tool. Thus, the first turning step according to prior art may be dispensed with.

Further, prior art problems relating to grindings sticking between the two cutting wheels are decreased or prevented. All in all, a more reliable manufacturing process is achieved.

It is also desirable to provide a machining tool adapted for manufacturing a wall structure provided with cooling channels, which creates conditions for a faster operation than previously known methods.

According to another aspect of the present invention, a machining tool comprises a first rotary cutting element and a second rotary cutting element, wherein the first and second rotary cutting elements are positioned at a distance from each other, wherein the machining tool comprises, a third rotary cutting element arranged between the first and second rotary cutting elements.

Further preferred embodiments and advantages will be apparent from the following description and drawings.

BRIEF DESCRIPTION OF THE DRAWINGS

The invention will be further described in the following, in a non-limiting way with reference to the accompanying drawings in which.

DETAILED DESCRIPTION

Figure 1:
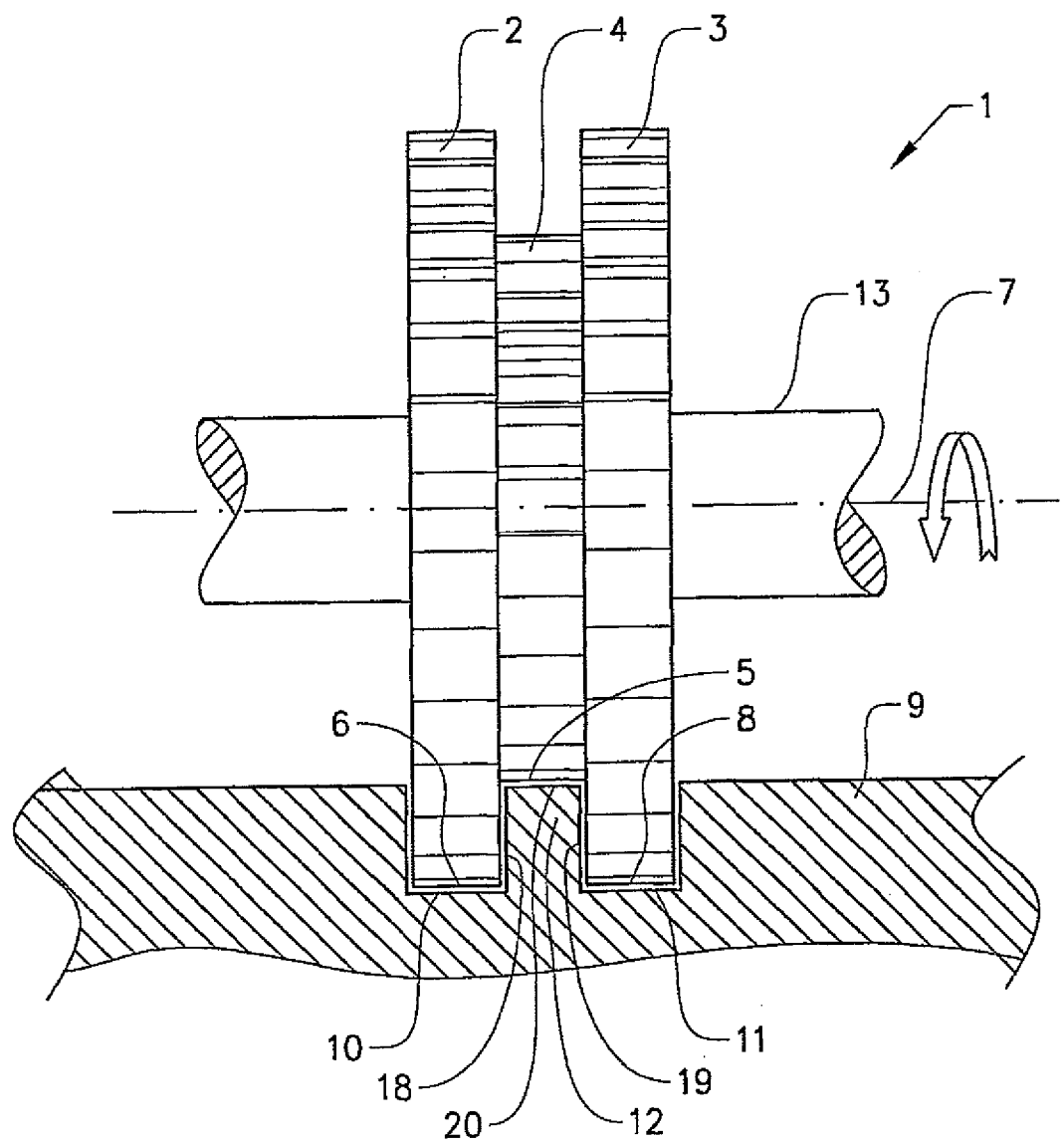
FIG. 1 is a front view of a machining tool according to a first embodiment.
Figure 2:
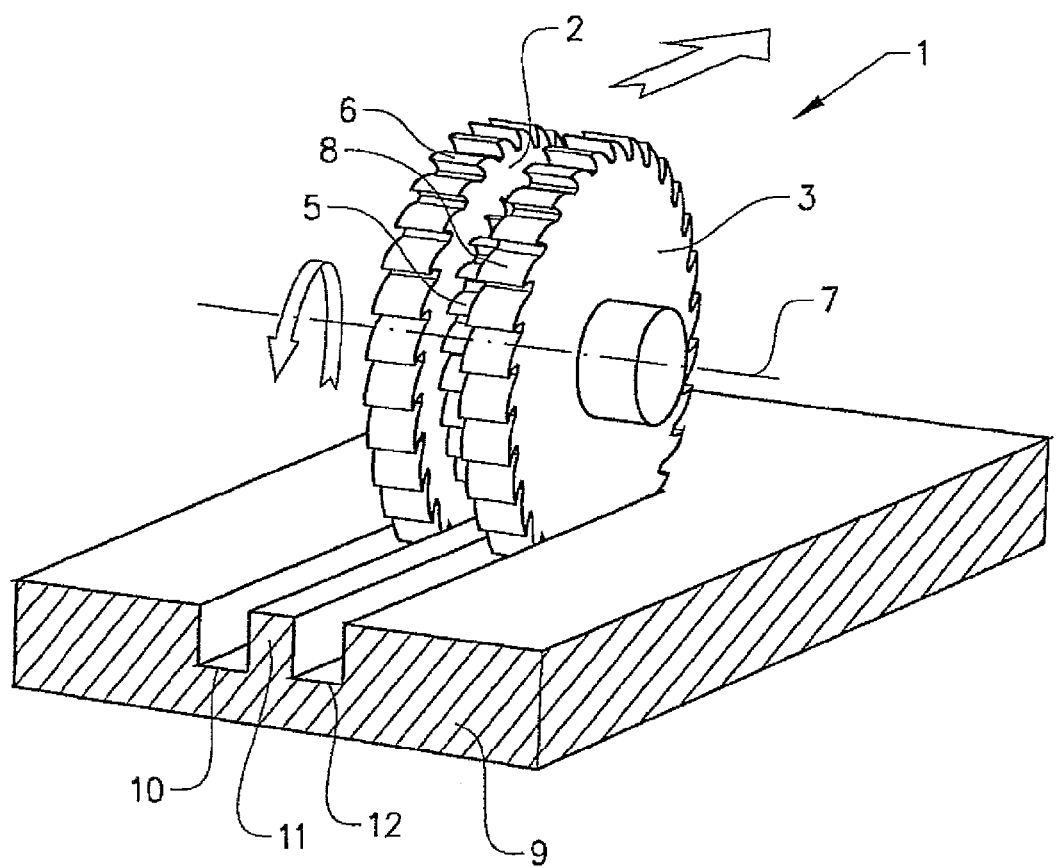
FIG. 2 is a perspective view of the machining tool of FIG. 1.
Figure 3:
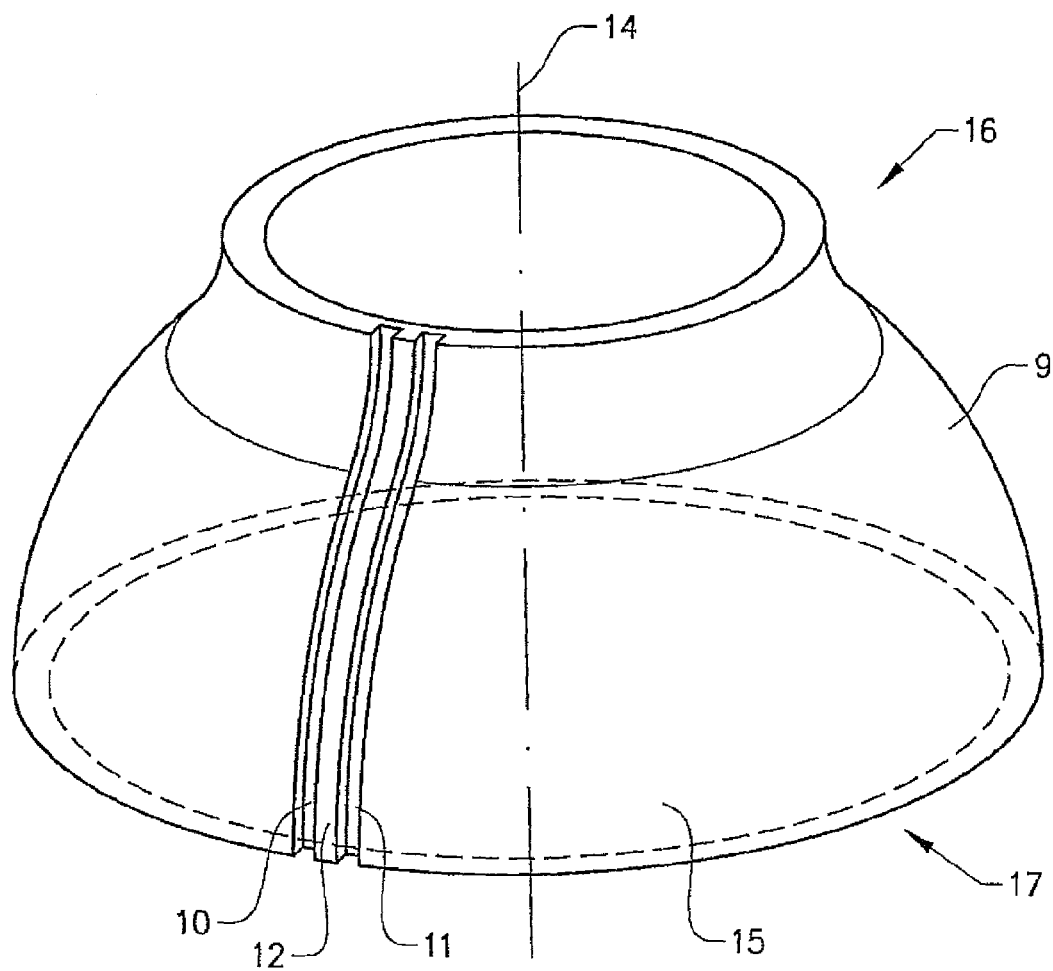
FIG. 3 is a perspective view of a tubular workpiece with a varying diameter, which has been machined by the machining tool in a first step.

FIGS. 1 and 2 schematically shows a machining tool 1. The machining tool 1 comprises a first rotary cutting element 2 and a second rotary cutting element 3, wherein the first and second rotary cutting elements 2,3 are positioned at a distance from each other. The machining tool 1 further comprises a third rotary cutting element 4 arranged between the first and second rotary cutting elements. Each of the rotary cutting elements 2,3,4 has the shape of a circular disc with a cutting surface in the form of cutting teeth 5,6,8 at the periphery.

More particularly, the first and second rotary cutting elements 2,3 have parallel axes of rotation 7, and wherein the first and second rotary cutting elements 2,3 are positioned at a distance from each other in the direction of the axes of rotation 7. More particularly, the first and second rotary cutting elements 2,3 form two spaced cutting wheels arranged at a mutual distance corresponding to a desired web thickness.

The third rotary cutting element 4 is configured to machine a surface simultaneously with the first and second rotary cutting elements 2,3.

A cutting surface 5 of the third rotary cutting element 4 is located at a different distance from a cutting surface 6 of the first rotary element 2 in a direction perpendicular to the axis of rotation 7 of the first rotary cutting element 1. More particularly, the cutting edge 5 of the third cutting element 4 is located at a smaller distance from the axis of rotation 7 than the cutting edge 6 of the first rotary element 2. A cutting edge 8 of the second rotary cutting element 3 is located at substantially the same position in a direction perpendicular to the axis of rotation 7 as the cutting edge 6 of the first rotary cutting element 2.

By feeding the machining tool 1 along a workpiece 9 while rotating the rotary cutting elements 2,3,4 and bringing the rotary cutting elements 2,3,4 in contact with the workpiece, two parallel grooves 10,11 and an intermediate elongated web (or rib) 12 are achieved in the workpiece 9.

The axis of rotation of the second rotary cutting element 3 is in parallel with the axis of rotation 7 of the first cutting element 2. More precisely, the axes of rotation of the first and second rotary cutting elements 2,3 are co-axial. Similarly, the axis of rotation of the third rotary cutting element 4 is in parallel with the axis of rotation 7 of the first cutting element 2. More precisely, the axes of rotation of the first, second and third rotary cutting elements 2,3,4 are co-axial.

The first, second and third rotary cutting elements 2,3,4 are configured to rotate in unison at the same speed. Further, the first, second and third rotary cutting elements 2,3,4 are preferably arranged on a common drive shaft 13.

The cutting edge 5 of the third cutting element 4 extends over substantially the complete distance between the first and second rotary cutting elements 2,3.

A first embodiment of a method for manufacturing a tubular wall structure with varying diameter, especially configured for withstanding high thermal load in operation and particularly for a rocket engine component in the form of an outlet nozzle, is described below with reference to FIG. 3-9.

A workpiece 9 with a cylindrical shape is used as a starting material. More specifically, the workpiece 9 is tubular with a circular cross section, wherein a cross section diameter varies in an axial direction 14 of the workpiece. Thus, the workpiece 9 forms a hollow component. More specifically, the workpiece 9 presents a rotational symmetric outer surface. The diameter of the workpiece 9 continuously increases with axial position in one direction along the axial direction 14. Further, the workpiece 9 has a substantially uniform thickness and is preferably formed by a sheet metal. In some cases a forging or casting, with varying thickness along the axial direction 14 could be preferred.

The method comprises machining an external surface 15 of the workpiece 9 by means of the machining tool 1. More particularly, the method comprises the step of producing an elongated web 12 in the envelope surface 15 of the workpiece 9 by feeding the machining tool 1 along and into the workpiece from a first end 16 towards a second end 17 of the workpiece 9 in the axial direction 14. Thus, the machining tool is fed along a curved line matching the contour of the workpiece 9. In other words, the method comprises milling two parallel grooves 10,11 in the outer surface of a monolithic channel wall section.

The first end 16 has a smaller cross section diameter than the second end 17. The machining tool 1 simultaneously machines a first side surface 18, a second side surface 19 and a top surface 20 of the web 12, see FIG. 1.

In other words, the method comprises simultaneously machining a base (depth) of the first groove 10, which defines the first side surface 18 of the web, and a base (depth) of a second groove 11, which defines the second side surface 19 of the web 12.

Figure 4:
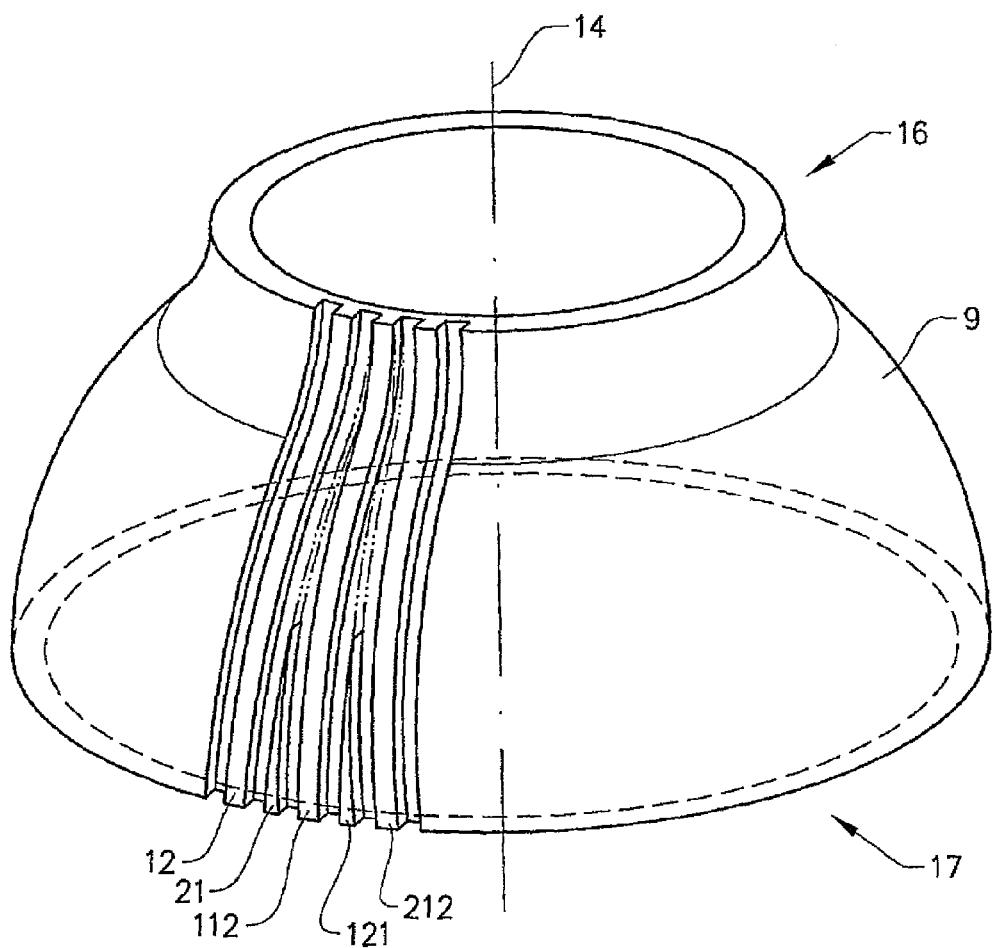
FIG. 4 shows the tubular workpiece of FIG. 3, wherein it has been machined by the machining tool in a plurality of steps by indexing the machining tool in the circumferential direction of the workpiece.
Figure 5:
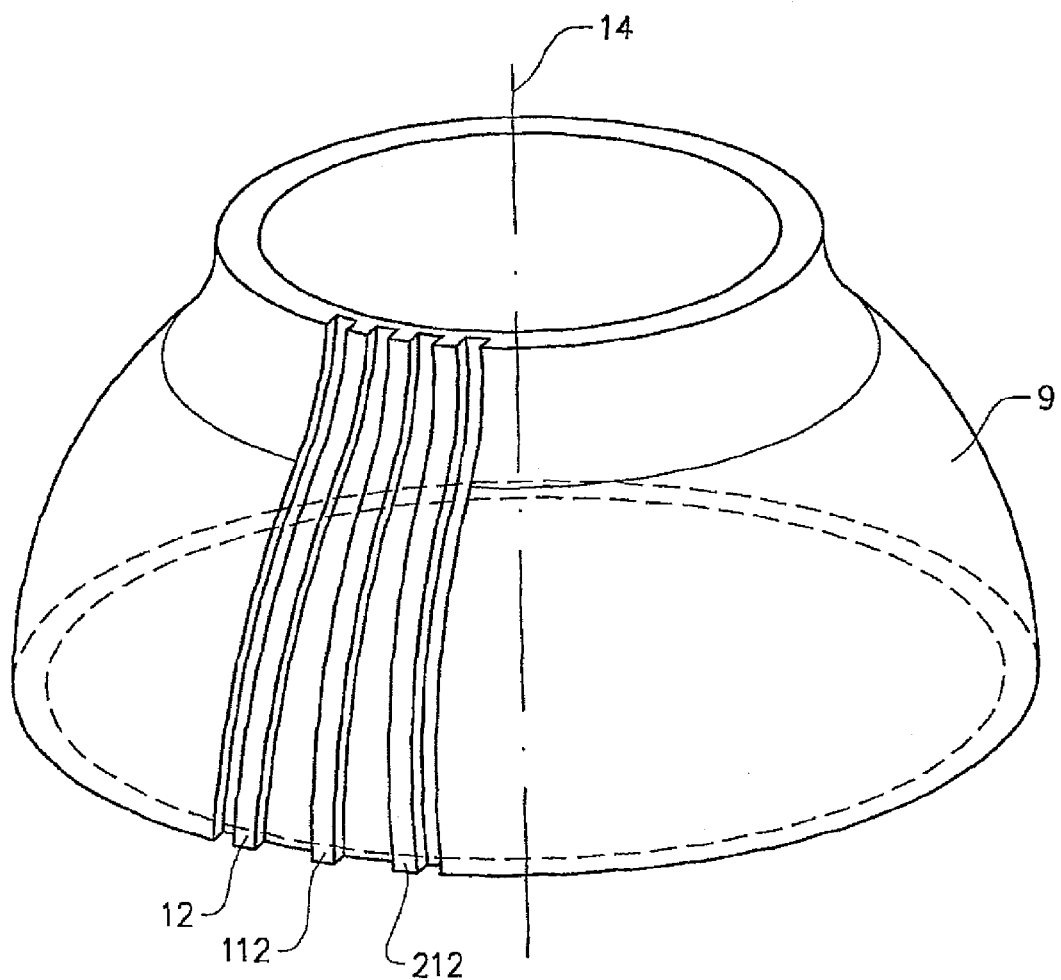
FIG. 5 shows the tubular workpiece after a further machining step.

Referring now to FIG. 4, the method comprises the steps of producing a plurality of spaced elongated webs 12,112,212 in the same way by indexing said machine tool 1 a distance in a circumferential direction of the workpiece 9 after each web is produced. More particularly, the machining tool 1 is indexed such a distance in the circumferential direction that the first rotary cutting element 2 is positioned in the groove 11 produced by the second rotary cutting element 3 in the previous step. Due to the varying diameter of the workpiece 9, the webs 12,112,212 are produced so that they extend in a diverging manner from the first end 16 to the second end 17.

A non-machined, triangular region 21,121 of the workpiece 9 is left between two produced adjacent diverging webs 12,112,212. This region 21,121 is machined in a later step, preferably by means of an additional machining tool, specifically adapted for removing such a region. The non-machined region 21,121 is machined in the later step to such an extent that a workpiece surface between the produced webs is, if desired, substantially even, see FIG. 5. More particularly, the non-machined region 21,121 is machined in the later step to such an extent, if desired, that a workpiece thickness is substantially constant between the webs 12,112,212. Preferably, the workpiece 9 is machined by means of the machining tool 1 in consecutive, indexed runs all around its circumference first, and then all the non-worked regions 21,121 are machined in later steps.

Figure 6:
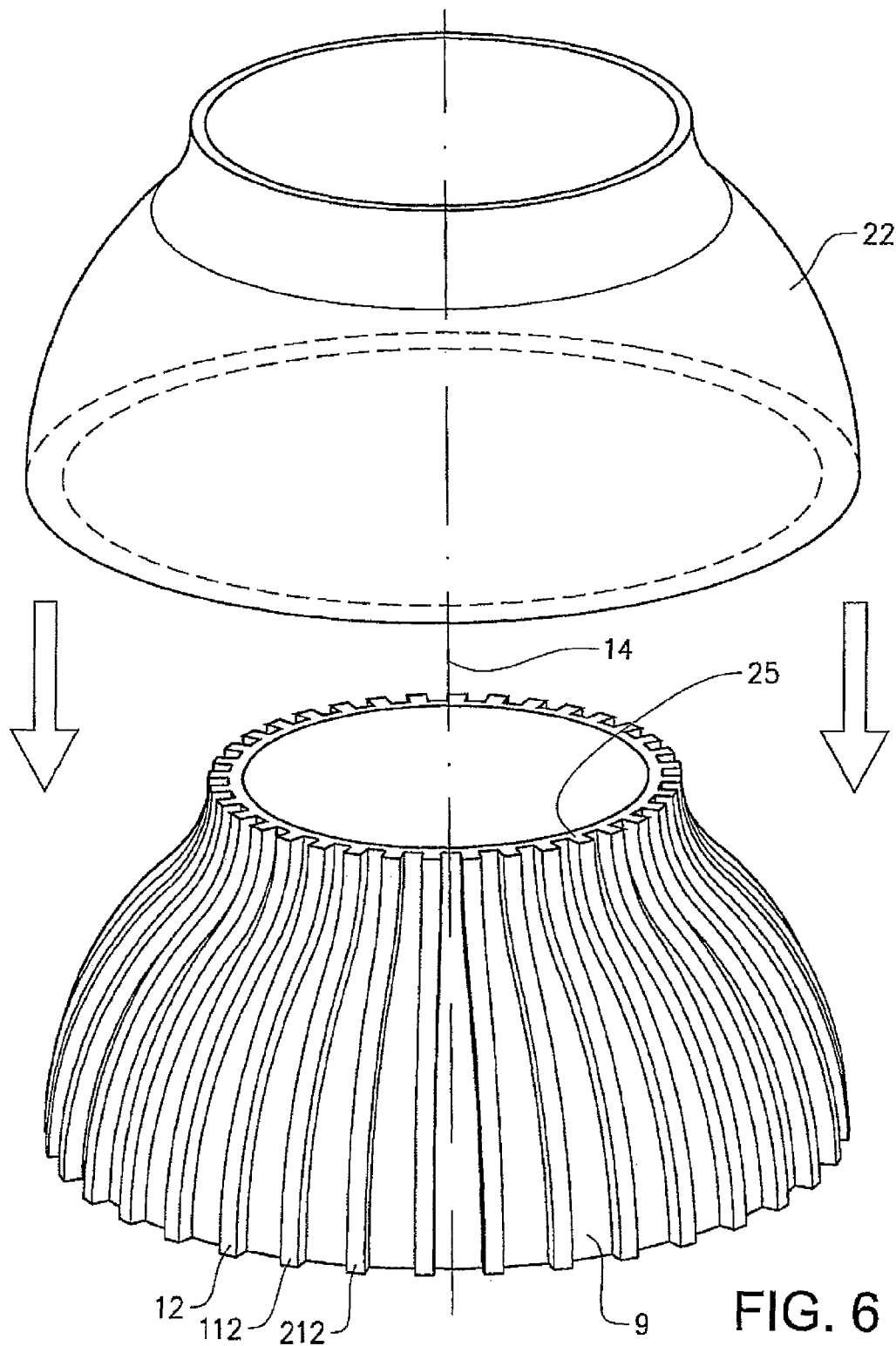
FIG. 6 shows application of a cover jacket onto the machined workpiece.

Referring now to FIG. 6, an inner wall 25 is formed with circumferentially spaced elongated webs 12,112,212 projecting from the inner wall 25 and at right angles to the wall. Thus, the webs 12,112,212 are integrated in the inner wall 25. In other words, the inner wall 25 and the webs 12,112,212 are formed in one-piece. The inner wall 25 forms a cylinder and is preferably continuous in a circumferential direction.

The method comprises the step of applying a cover jacket (or second wall element) 22 onto the workpiece 9 after said webs are formed and the non-worked regions are removed. The cover jacket 22 has a cylindrical shape which is complementary to the shape of the workpiece 9. Thus, the cover jacket 22 is tubular with a circular cross section, wherein a cross section diameter varies in an axial direction 14. More particularly, an internal surface of the cover jacket 22 is adapted to fit tightly onto the external surface of the webs 12,112,212. The cover jacket 22 is moved in the axial direction 14 relative to the workpiece 9 until it is fitted onto the workpiece 9.

Figure 7:
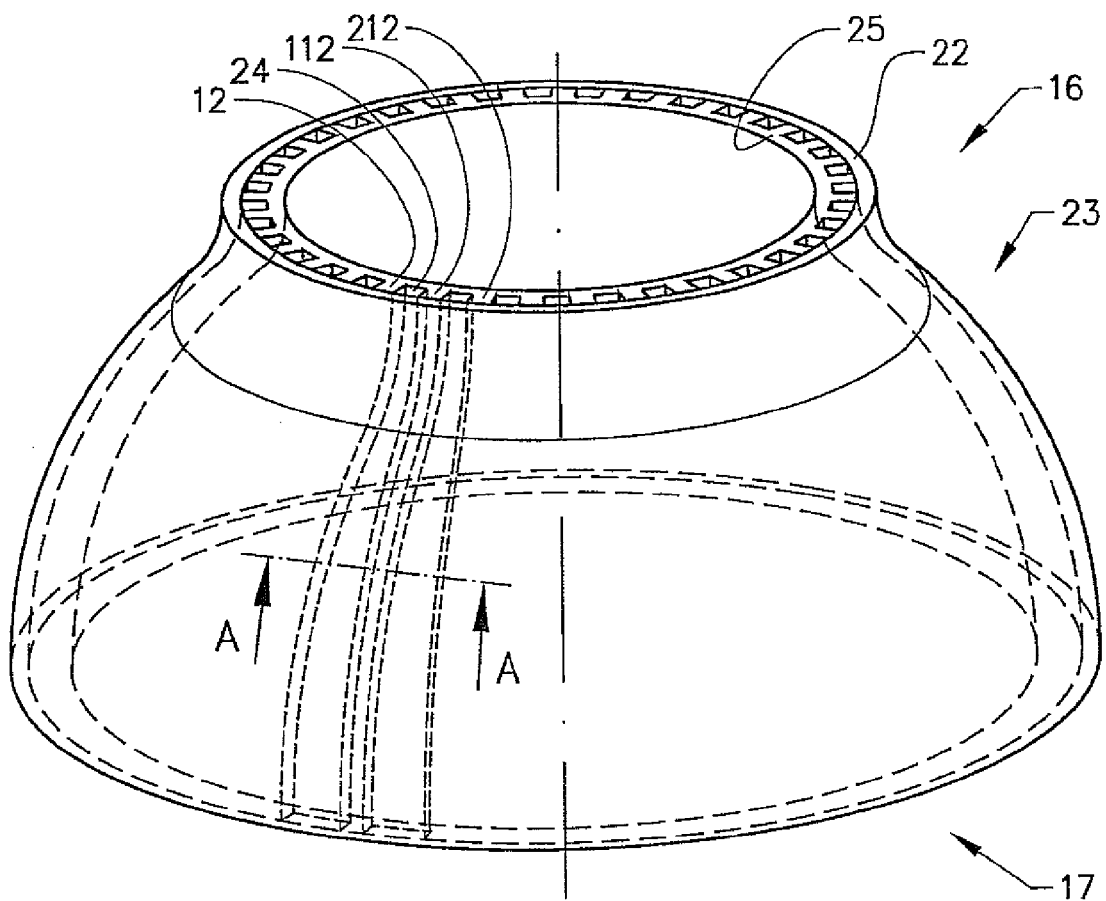
FIG. 7 shows a perspective view of a wall structure resulting from the method step of FIG. 6, wherein the wall structure defines a double wall/sandwich structure.
Figure 8:
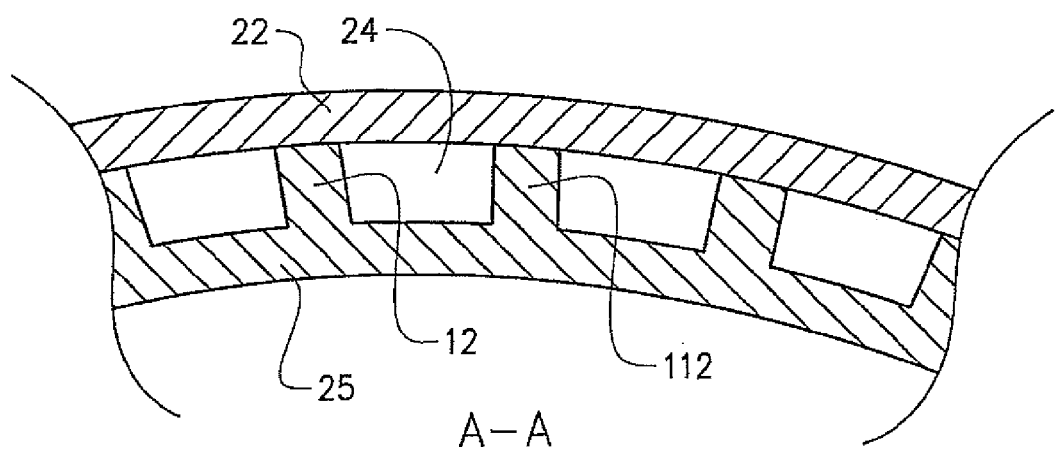
FIG. 8 is a partial sectional view along the line A-A in FIG. 7, and FIG. 9 corresponds to the view of FIG. 8 with added wall structure welds.

FIG. 7 shows a wall structure 23 formed when the cover jacket 22 is applied onto the workpiece 9. The webs 12,112, 212 are adapted to form mid walls between the inner wall 25 and the outer wall 22 formed by the cover jacket. Thus, the webs form distancing elements for keeping a distance between the inner and outer walls 25,22. FIG. 8 shows a cross section A-A from FIG. 7.

Figure 9:
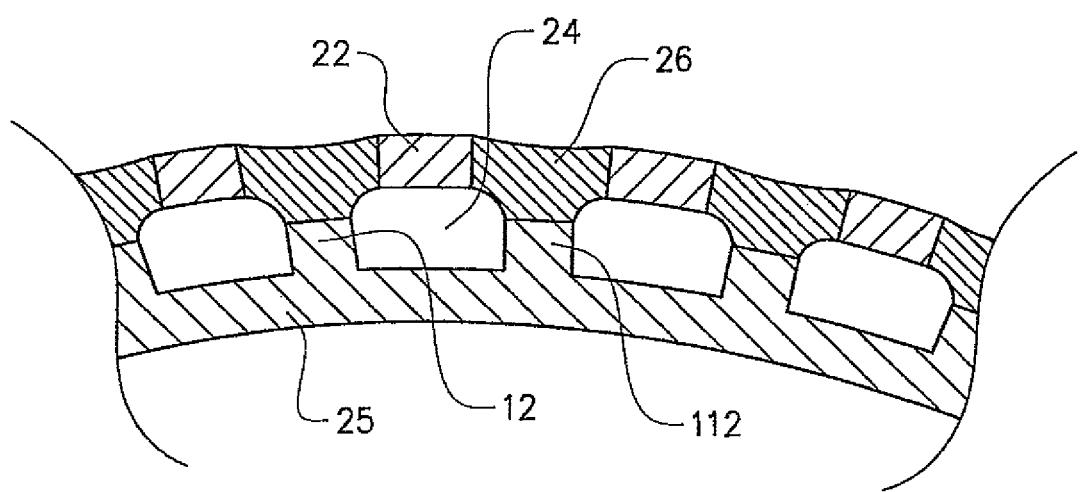

Thus, the tubular outer wall 22 is positioned around the inner wall and thereafter attached to the workpiece 9, preferably via joining it to the edges of the webs 12,112,212 by welding from an outer side of the outer wall relative to the cooling channels, see FIG. 9. Thus, the wall structure 23 forms a welded sandwich structure.

Preferably, laser-welding is used for joining the outer wall 22 to the webs. The welding is performed in such a way that the joined-together portions of the wall 22 and each web 12,112,212 form a T-shaped joint 26, see FIG. 9. Suitable selection of material parameters and welding parameters makes it possible to obtain a T-shaped joint with rounded corners, or at least a relatively smooth transition, between the wall and the respective web. This results in a high-strength construction and thus an extended life. Alternatively, a construction with thinner wall thicknesses and thus reduced weight can be obtained.

In order that the welded joint comes to lie in exactly the correct position, a previously known joint-tracking technique can be used.

Elongated channels 24 are formed between the webs 12,112 and the cover jacket 22. The elongated channels 24 are adapted for internal cooling. Thus, a cooling channel cross section area increases progressively in direction from the first end 16 (inlet end) of the wall structure 23 to the second end 17 (outlet end).

More specifically, the wall structure 23 forms an engine wall structure. The wall structure 23 forms a rocket engine member for a thrust chamber. The thrust chamber is a combustion chamber with an outlet nozzle for expansion of the combustion gases. More specifically, the wall structure forms an outlet nozzle for use in a liquid fuel rocket engine. The liquid fuel is for example liquid hydrogen.

The nozzle 23 is cooled with the aid of a cooling medium that is preferably also used as fuel in the particular rocket engine. The invention is however not limited to outlet nozzles of this type but can also be used in those cases in which the cooling medium is dumped after it has been used for cooling.

The materials used for the walls 25,22 and webs 12,112, 212 consist of or comprise weldable materials, such as stainless steel, for example of the type 347 or A286. Use can alternatively be made of nickel-based alloys such as, for example, INCO600, 1NCO625, INCO718 and Hastaloy x. According to other variants, cobalt-based alloys, for example of the type HAYNES 188 and HAYNES 230, can be used. Various types of aluminum alloys can also be used. Combinations of different materials are also possible.

For the welding operation, laser-welding is preferably used, but other types of welding arrangement, for example an electro-beam welder, can also be used according to the invention.

By accurate matching of the welding procedure, material selection and dimensions of walls and webs, the laser-welding produces the T-shape at the joint and also a softly rounded shape on the inner corners between the outer wall 110 and the web edge. Welding is suitably effected by means of a continuous weld. The rounded shape of the welded joints results in a high-strength construction and thus a long life of the component. This type of joining together affords opportunities for complete fusion of the welded joint and fine transitions between the parts.

In order to obtain a desired diameter ratio of the outlet nozzle, the cross sectional area of the cooling channels must increase towards the part of the nozzle with a larger diameter. The nozzle is therefore normally built in several sections in the axial direction. The number of webs is larger in the nozzle section with larger diameter. Adjacent axial sections are joined by a weld at the inner wall. The webs are interrupted and a manifold is arranged in a tangential direction between the ends of the webs forming a tangential cooling duct.

The invention is not limited to the above-described embodiments, but several modifications are possible within the scope of the following claims.

According to an alternative to laser welding, soldering may be used to attach the outer wall to the webs. Further, solid state welding, e.g. friction welding may be used. According to a further alternative, the outer wall is built up via an electrochemical process, such as plating.

According to an alternative embodiment, the wall structure is configured to form an aircraft engine component, such as turbine engine housing.

Further, the invention is not limited to being applied to circular cylindrical structures, but may as well be applied on a substantially flat sheet. The sheet may in a later stage be curved to form said cylindrical shape.

The invention claimed is:

1. A method of manufacturing wall structure for a rocket engine nozzle comprising the steps of
providing a workpiece with a cylindrical shape having a circular cross section which cross section diameter varies in an axial direction of the workpiece,
producing a plurality of spaced elongated webs in the workpiece by feeding a machining tool along the workpiece, wherein the plurality of spaced elongated webs are produced by indexing the machine tool in relation to the workpiece, wherein the webs are produced so that they extend in a diverging manner from a first end of the work piece to a second end of the work piece and are distributed around a circumference of the workpiece, wherein in a step of producing one elongated web the machining tool simultaneously machines to first side surface of the web, a second side surface of the web and a top surface of the web.

2. A method according to claim 1, comprising the steps of simultaneously machining a base of a first groove, which defines the first side surface of the web, and a base of a second groove, which defines the second side surface of the web.

3. A method according to claim 1, comprising the step of applying a cover jacket onto the workpiece after the webs are formed and attaching the cover jacket to the workpiece, wherein elongated channels are formed between the webs and the cover jacket.

4. A method according to claim 1, wherein the workpiece has a cylindrical shape and comprising the steps of producing the web on an external surface of the cylindrical workpiece.

5. A method according to claim 1, comprising the step of applying an annular cover jacket around the cylindrical workpiece after the webs are formed in the external surface of the workpiece.

6. A method according to claim 1, comprising the step of configuring the wall structure to withstand a high thermal load in operation.

7. A method according to claim 1, comprising, after forming a first web, forming a second web after indexing the machine tool in a circumferential direction of the workpiece with reference to the first web.

8. A method according to claim 7, wherein the machine tool comprises a first rotary cutting element for forming the first side surface and a first groove and a second rotary cutting element for forming the second side surface and a second groove, and the machine tool is indexed in the circumferential direction to form the second web by positioning the first rotary element in the second groove.

9. A method according to claim 1, wherein a nonmachined region of the workpiece between two produced adjacent diverging webs is machined in a later step.

10. A method according to claim 9, wherein the non-machined region is machined in the later step to such an extent that a workpiece thickness is substantially constant between the webs.

11. A method according to claim 9, wherein the nonmachined region is machined in the later step to such an extent that a workpiece surface between the produced webs is substantially even.

12. A method according to claim 11, wherein the non-machined region is machined in the later step to such an extent that a workpiece thickness is substantially constant between the webs.

* * * * *